(12) United States Patent
Tsuda et al.

(10) Patent No.: US 7,496,256 B2
(45) Date of Patent: Feb. 24, 2009

(54) DIFFRACTION GRATING AND DISPERSION COMPENSATION CIRCUIT

(75) Inventors: Hiroyuki Tsuda, Yokohama (JP); Hiroshi Ishikawa, Tokyo (JP); Hisato Uetsuka, Tokyo (JP)

(73) Assignees: KEIO University, Tokyo (JP); Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/882,511

(22) Filed: Aug. 2, 2007

(65) Prior Publication Data

US 2008/0056643 A1 Mar. 6, 2008

(30) Foreign Application Priority Data

Aug. 4, 2006 (JP) .............................. 2006-213547

(51) Int. Cl.
*G02B 6/26* (2006.01)

(52) U.S. Cl. .......................................... 385/37; 385/46

(58) Field of Classification Search .................. 385/37, 385/46

See application file for complete search history.

(56) References Cited

U.S. PATENT DOCUMENTS

| | | | | |
|---|---|---|---|---|
| 5,546,483 | A * | 8/1996 | Inoue et al. | 385/14 |
| 6,072,920 | A * | 6/2000 | Ando et al. | 385/11 |
| 6,222,963 | B1 * | 4/2001 | Grand et al. | 385/39 |
| 6,377,723 | B1 * | 4/2002 | Saito et al. | 385/15 |
| 6,466,707 | B1 * | 10/2002 | Dawes et al. | 385/14 |
| 6,546,161 | B2 * | 4/2003 | Okuno et al. | 385/14 |
| 6,788,848 | B2 * | 9/2004 | Yoneda | 385/37 |
| 6,956,987 | B2 * | 10/2005 | Doerr | 385/17 |
| 6,993,217 | B2 * | 1/2006 | Maruyama et al. | 385/16 |
| 7,013,065 | B2 * | 3/2006 | Petermann et al. | 385/37 |
| 2004/0208417 | A1 * | 10/2004 | Purchase et al. | 385/14 |

FOREIGN PATENT DOCUMENTS

| | | |
|---|---|---|
| JP | 10-186151 | 7/1998 |
| JP | 11-287916 | 10/1999 |
| JP | 2000-241637 | 9/2000 |
| JP | 2004-020837 | 1/2004 |
| JP | 2005-242214 | 9/2005 |
| JP | 2005-250022 | 9/2005 |

OTHER PUBLICATIONS

Japanese Office Action, Apr. 22, 2008, issued in JP 2006-213547.

(Continued)

*Primary Examiner*—Ellen Kim
(74) *Attorney, Agent, or Firm*—Edwards Angell Palmer & Dodge LLP

(57) ABSTRACT

A diffraction grating of the present invention includes a first block (101) and a second block (102). The first block (101) is made up of a plurality of input waveguides (103), a slab waveguide (104), a delay waveguide array (105) and narrow grooves (106): each of which being filled with resin. The second block (102) is made up of a plurality of input waveguides (107), a slab waveguide (108) and a plurality of output waveguides (109). Since a circuit is cut off at the ends of the arrayed waveguides, a relative phase can easily be measured. The resin has undergone a refractive-index adjustment and compensates a phase error.

5 Claims, 19 Drawing Sheets

OTHER PUBLICATIONS

A. Tate et al., "Multistage Polymeric Lens Structure in Silica-Waveguides for Photonic Functional Circuits," Photonics West 2005, 5724-52, Jan. 22-27, San Jose, USA, 2005.

M. Ishida et al., *"Planar 1×2 Optical Deflector Switch Fabricated on a Silica Waveguide,"* Photonics West 2005, 5728-48, Jan. 22-27, San Jose, USA 2005.

M. Yasumoto et al., "Wavefront Compensation Lens System in an Arrayed-Waveguide Grating for hybrid Integration of a Phase encoding Mirror," 2005 Frontiers in Optics/Laser Science Conferences, FWE4, Tucson, USA, Oct. 16-20, 2005.

K. Masuda et al., "A Novel 2×2 Multi-Arm Type of Optical Switch Using Multimode interference Couplers," IEICE Electronics Express, vol. 3, No. 9, pp. 191-196, 2006.

M. Yasumoto et al., "Arrayed-Waveguide Grating with Wavefront Compensation Lenses for Spatial Filter Integration," IEICE Electronics Express, vol. 3, No. 11, pp. 221-226, 2006.

A. Tate et al., *"Multistage Polymeric Lens Structures Integrated into Silica Waveguides,"* Jpn. J. Appl. Phys., PT1, vol. 45, No. 8A, pp. 6288-6293, 2006.

K. Masuda et al., "Beam Steering Type 1:4 Optical Switch Using Thermo-Optic Effect," Opt. Rev., vol. 13, No. 4, pp. 184-188, 2006.

K. Masuda et al., *"Proposal of the Optical Switch with Phase Shifters in a Silica Arrayed Waveguide,"* Proceedings of the 2005 IEICE General Conference, C-3-17, p. 187, Mar. 21, 2005.

M. Ishida et al., *"A Study of Silica 1×2 Deflector Prism Switch,"* Proceedings of the 2005 IEICE General Conference, C-3-15, p. 185, Mar. 21, 2005.

A. Tate et al., *"Multistage Polymer-Filled Lens Structure in Silica-Waveguides,"* The 52nd Extended Abstracts, Spring meeting, Japan Society of Applied Physics and Related Societies, 29a-ZQ-8, p. 1318, Mar. 29, 2005.

A. Tate et al., *"Polymer-Filled Lens Structure in Silica Waveguides,"* The IEICE Transactions on Electronics (Japanese Edition), C-3-73, p. 217, Sep. 20, 2005.

A. Tate et al., *"Multistage Polymer-Filled Lens Structure in Silica Waveguides,"* The 26th Digest of Technical Papers, Annual Meeting of the Laser Society of Japan, F09pVIII2, p. 193, Feb. 9, 2006.

K. Masuda et al., "Beam Steering Type 1:4 Optical Switch with Polymer Thermo-Optic Phase Shifters in a Silica Arrayed-Waveguide," Photonics West 2005, 5728-47, Jan. 22-27, San Jose USA, 2005.

\* cited by examiner

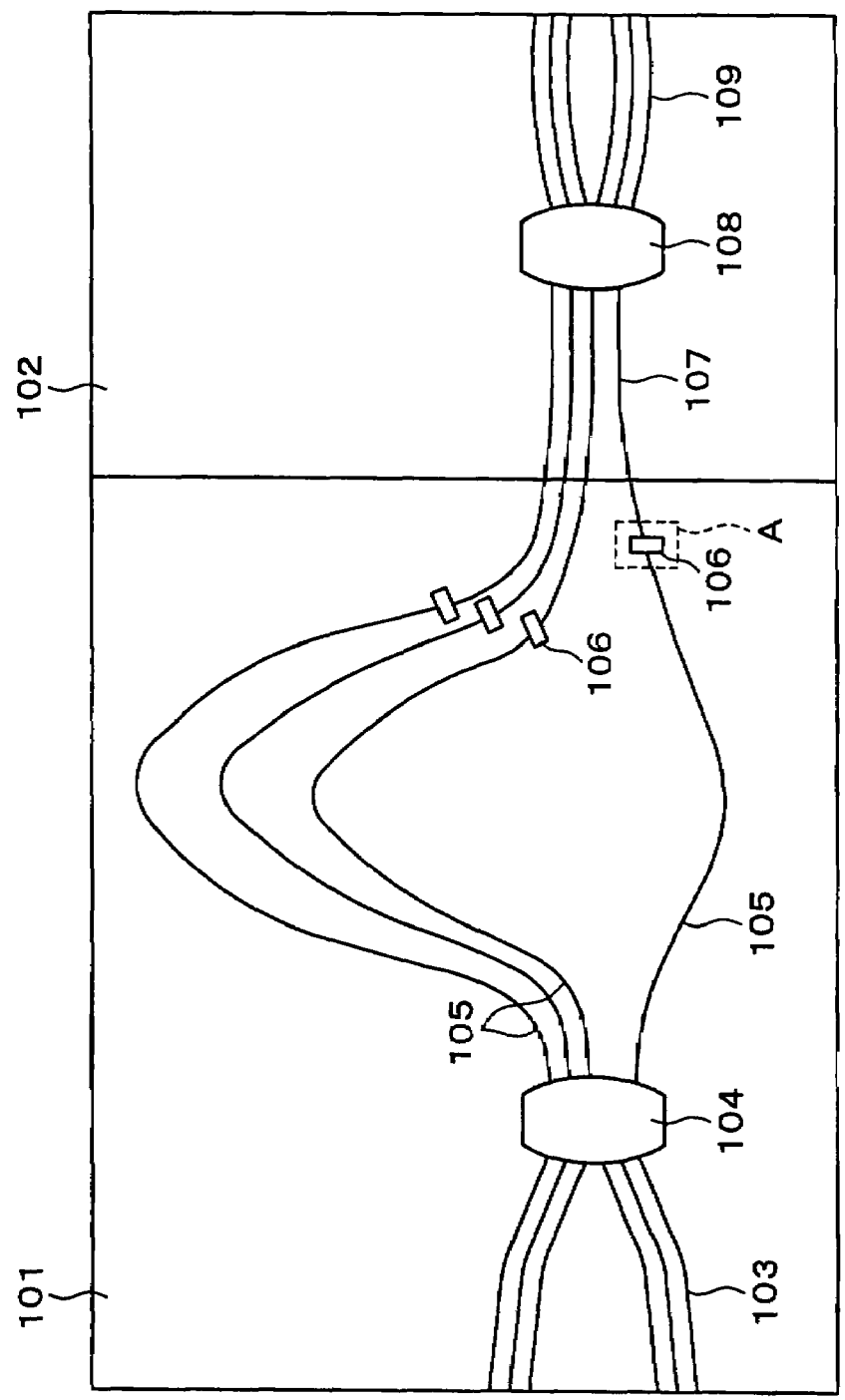

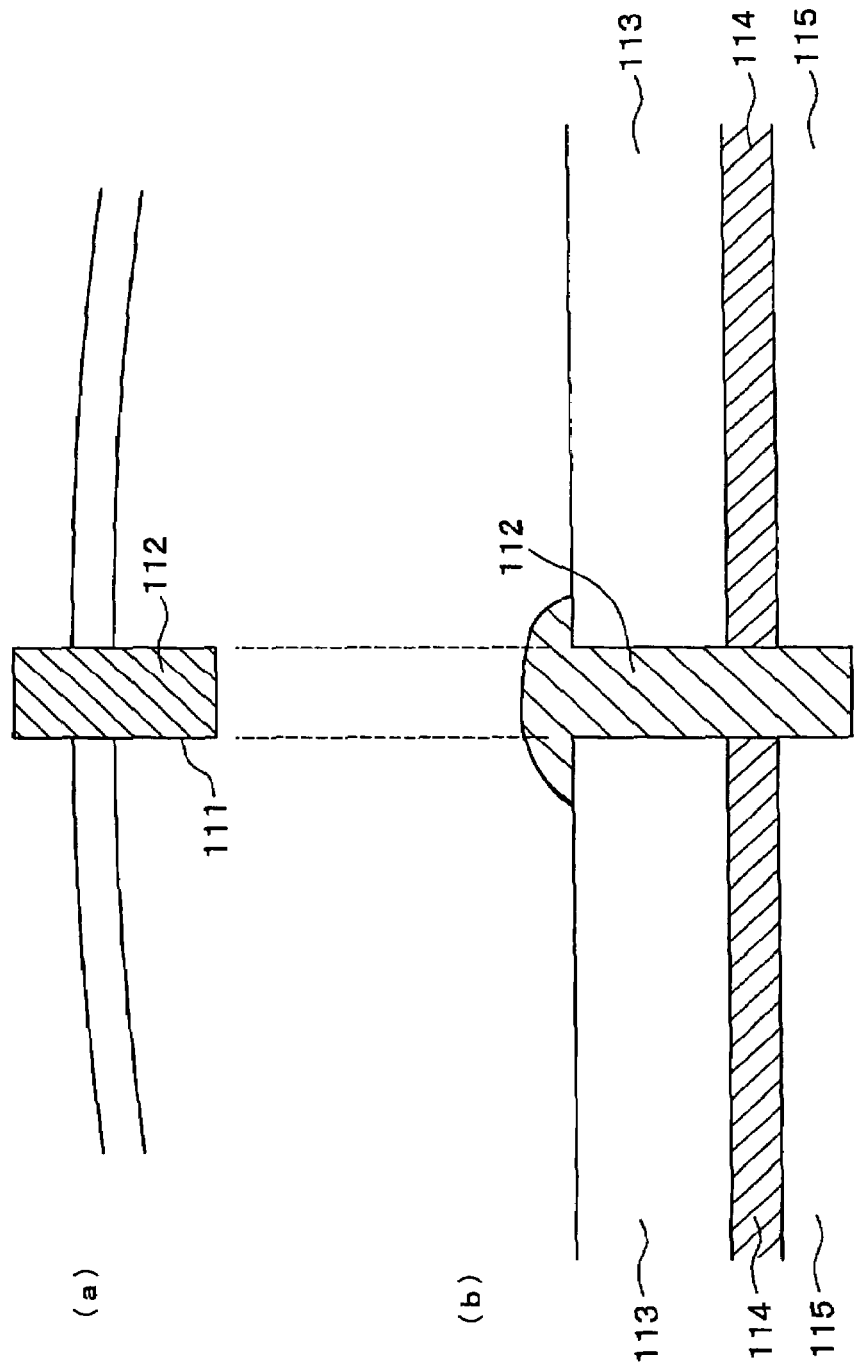

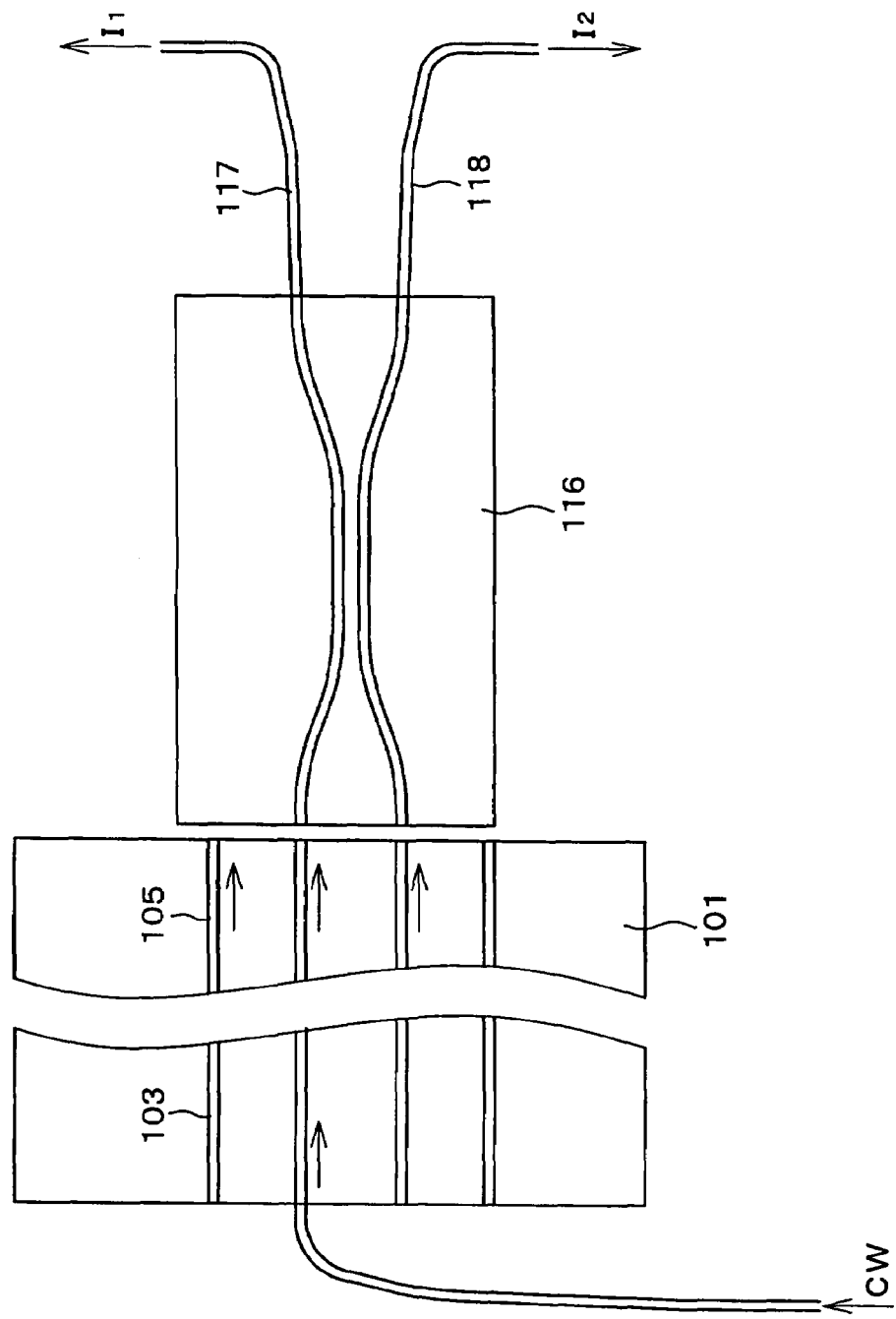

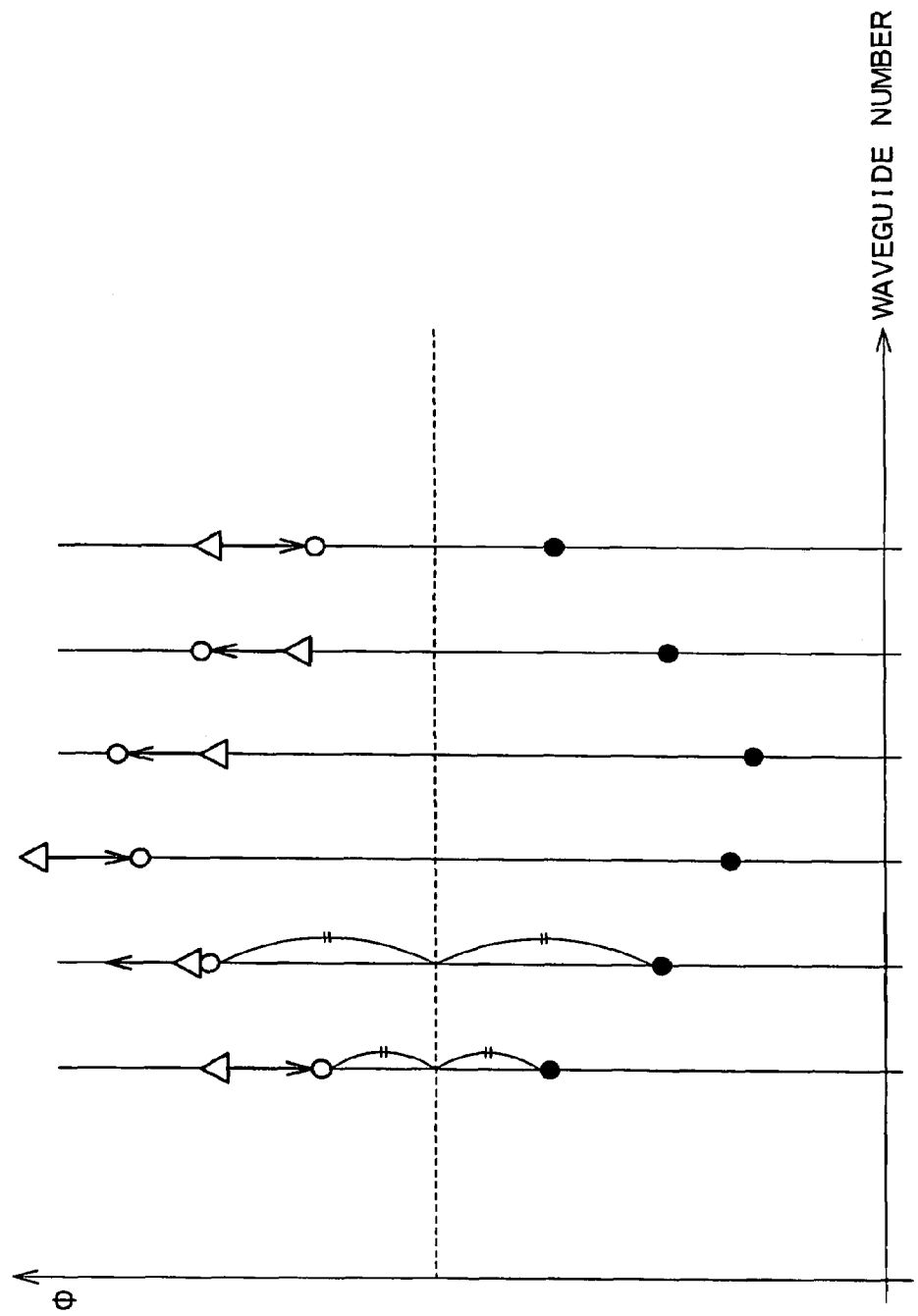

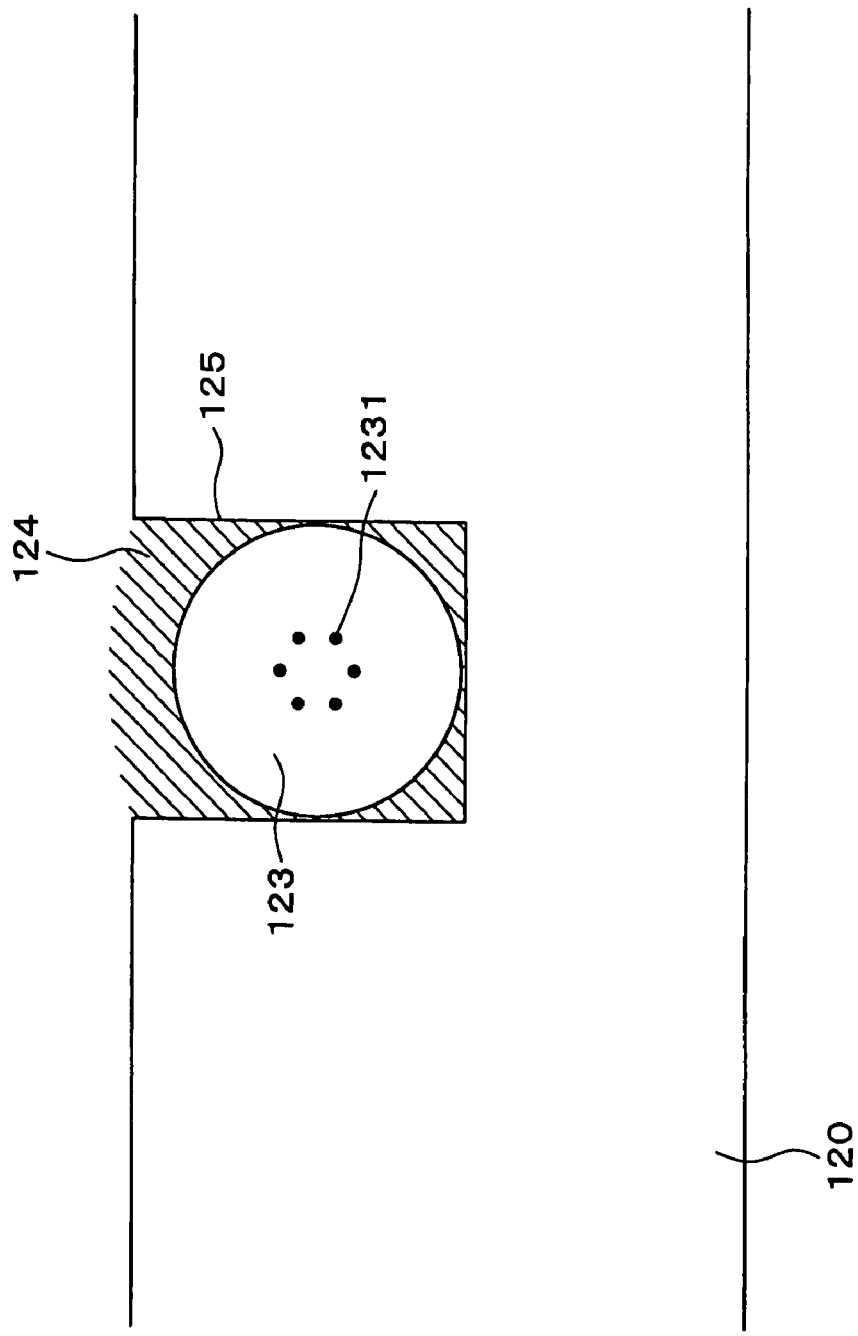

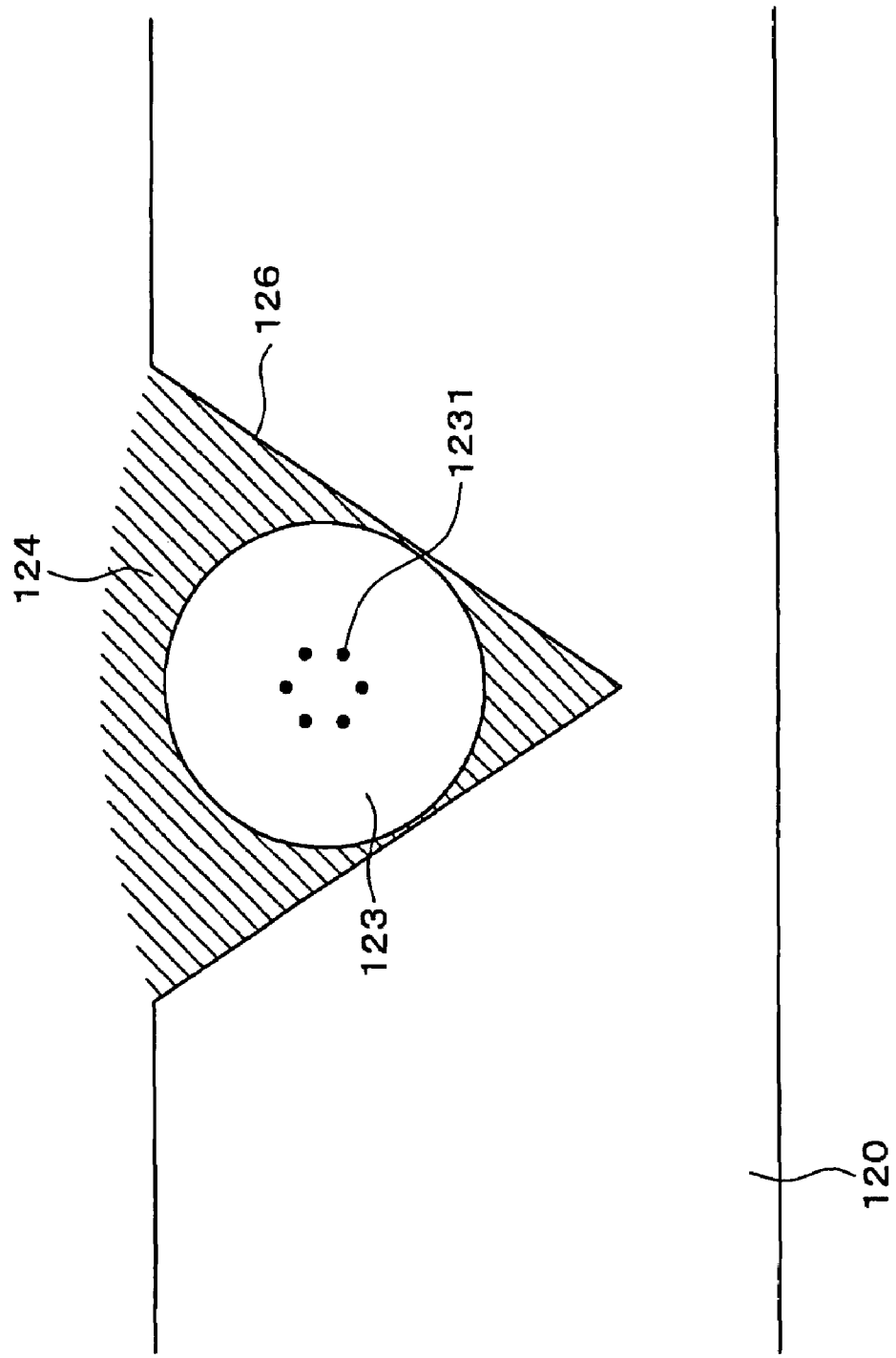

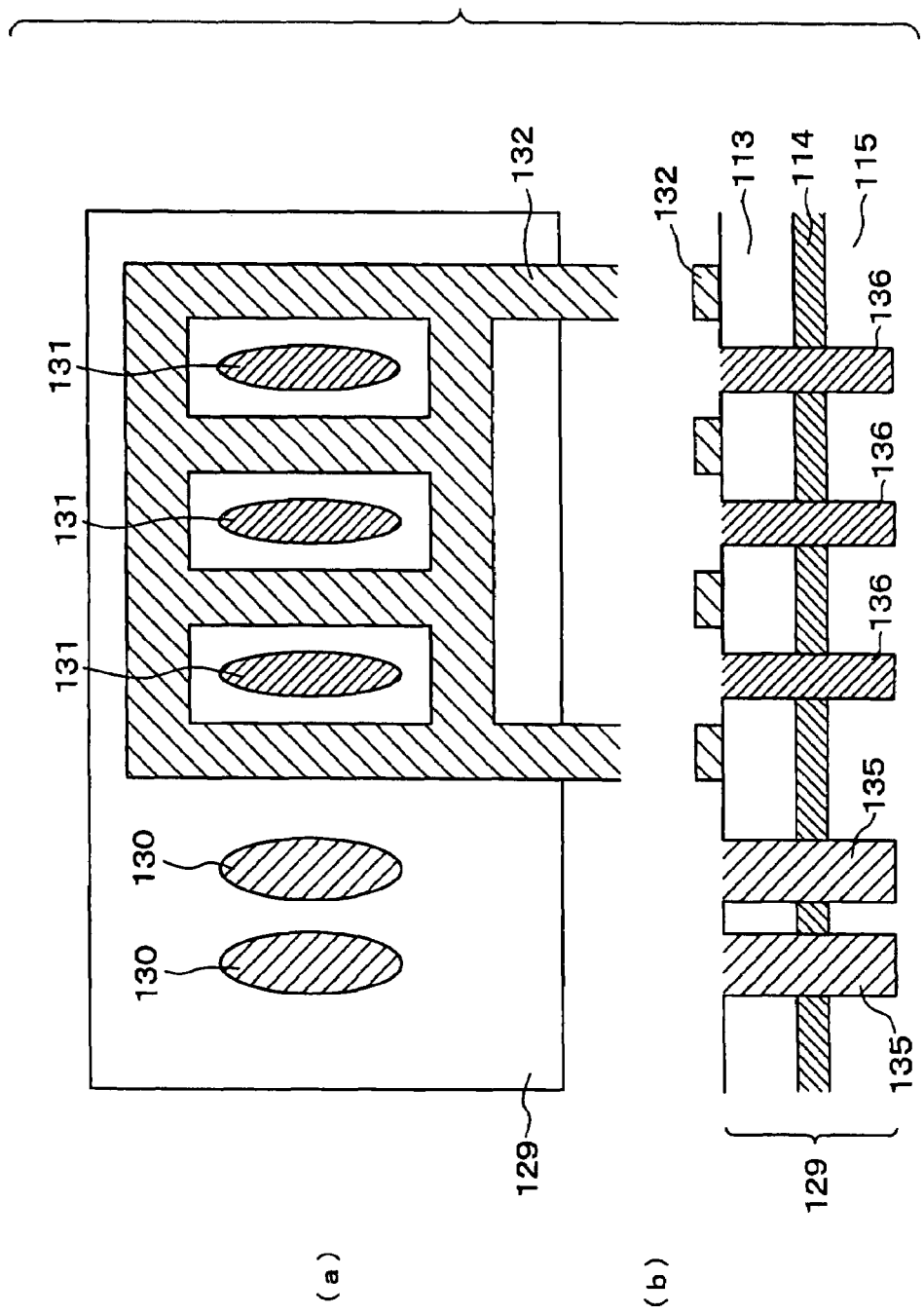

(a)

(b)

DIFFRACTION GRATING AND DISPERSION COMPENSATION CIRCUIT

TECHNICAL FIELD

The present invention relates to a diffraction grating and a dispersion compensation circuit that are effective for wavelength multiplexing/demultiplexing circuits, dispersion compensators and optical single-side-band communications.

BACKGROUND ART

An arrayed waveguide grating (AWG) is a device known as a multiplexing/demultiplexing circuit of a wavelength division multiplexing communication apparatus. Similarly, a dispersion compensation circuit having a lens structure in the arrayed waveguide grating is also a known device. Generally, the performance of an optical element depends on its size and precision. If the optical path length of each waveguide has no error, the frequency resolution of an arrayed waveguide grating is substantially determined by a difference in the optical path length between the longest and shortest waveguides of arrayed waveguides. However, when the optical path length becomes long, an error in the optical path length is inevitable. On the other hand, the upper limit of the optical path length is fixed by the size of a substrate. To solve these problems, a conventional technique has followed the procedures as shown below: first, (a) a circuit is reduced in size by enlarging the relative refractive index difference between waveguides, and a layout in which the optical path length is as long as possible is designed within the range of a given substrate size, or alternatively, the optical path length is increased by enlarging the substrate size, thereafter (b) a phase error (optical-path-length error) in a delay waveguide part is measured through interference spectrometry by using low-coherence broadband interferometry or by providing a interference light circuit on the same substrate; and subsequently (c) the phase error is compensated by changing the refractive index by such means as irradiating the arrayed waveguides with an ultraviolet laser beam.

[Patent Document 1] Japanese Unexamined Patent Application Publication No. 2004-20837

[Patent Document 2] Japanese Unexamined Patent Application Publication No. 2005-250022

DISCLOSURE OF THE INVENTION

Problems to be Solved by the Invention

However, the conventional technique has the following problems; that are, (1) An increase in the relative refractive index difference enhances the loss of a waveguide, and an increase in the substrate size deteriorates uniformity of the waveguide; (2) the low-coherence broadband interferometry has a complicated optical system that makes it difficult to perform a measuring operation, and if the interference light circuit is provided on the same substrate, an extra space will be required for the circuit; and (3) a laser beam used to change the refractive index requires a large-scale irradiation optical system.

In consideration of these circumstances, the present invention has attempted to achieve the following improvements:

(1) A method is carried out in which the delay circuit part is cut at its end so as to form another block, and a relative phase in the delay waveguide part is measured by connecting it to an optical circuit for phase measurement.

(2) In waveguides generally-used, an increase of a difference in relative refractive index leads to an increase in loss or to a deterioration in uniformity. Therefore, a long delay line array with a small loss has been realized by embedding a holey fiber that can be bent with a small bend radius with a small loss (see Patent Documents 1 and 2) in a groove on a substrate. Additionally, stacked-up delay waveguides or holey fibers wound on a bobbin are used.

(3) An optical path length error (phase error) is compensated by forming a small groove on the way of each delay waveguide as to obstruct the waveguide, and subsequently, by filling the groove with an organic material (resin, in particular) that has undergone a refractive index adjustment.

A conventional waveguide-type dispersion compensation circuit has a problem that the frequency resolution of the diffraction grating part is insufficient, and hence the amount of dispersion compensation is small. However, according to the present invention, since it is possible to realize a diffraction grating having high frequency resolution, a large amount of dispersion compensation can be obtained by applying the present invention to a waveguide-type dispersion compensation circuit. Additionally, in the conventional waveguide-type dispersion compensation circuit, the design freedom of a lens used for distributed-value control is low, hence the design for variable dispersion control is restricted. On the other hand, the present invention has the following feature:

(4) The range of variable dispersion compensation is enlarged by a combination of a lens that controls the focal distance and a lens that does not.

Means for Solving the Problems

A diffraction grating of the present invention comprises: (a) a first block, the first block including: a plurality of first input waveguides; a first star coupler connected to the first input waveguides; a plurality of delay waveguides connected to the first star coupler; and grooves that are provided instead of a part of the delay waveguides, each of which being filled with an organic material; and (b) a second block connected to the first block, the second block including: a plurality of second input waveguides; a second star coupler connected to the second input waveguides; and a plurality of output waveguides connected to the second star coupler.

Additionally, a diffraction grating of the present invention comprises a first block, a second block, a third block and a fourth block, the first to fourth blocks being connected together, both ends of a series of the first to fourth blocks being occupied by the first block and the fourth block, respectively, (a) the first block including: a plurality of first input waveguides; a first star coupler connected to the first input waveguides; and a plurality of first output waveguides connected to the first star coupler; (b) the second block having a plurality of groove structures that are formed on a substrate and in each of which a holey fiber is embedded; (c) the third block including: a plurality of delay waveguides; and grooves that are provided instead of a part of the delay waveguides, each of which being filled with an organic material; and (d) the fourth block including: a plurality of second input waveguides; a second star coupler connected to the second input waveguides; and a plurality of second output waveguides connected to the second star coupler.

Additionally, a dispersion compensation circuit of the present invention comprises: (a) a first block, the first block including: a plurality of first input waveguides; a star coupler connected to the first input waveguides; a plurality of delay waveguides connected to the star coupler; and grooves that are provided instead of a part of the delay waveguides, each of which being filled with an organic material; and (b) a second block connected to the first block, the second block including: a plurality of second input waveguides; a slab waveguide connected to the second input waveguide; grooves that are provided on an optical path of the slab waveguide, each of which being filled with an organic material; a heater provided around the grooves; and a mirror that is provided at an end of the slab waveguide and that is disposed on an end face of a substrate.

Additionally, a dispersion compensation circuit of the present invention comprises a first block, a second block, a third block and a fourth block, the first to fourth blocks being connected together, both ends of a series of the first to fourth blocks are occupied by the first block and the fourth block, respectively, (a) the first block including: a plurality of first input waveguides; a first star coupler connected to the first input waveguides; and a plurality of output waveguides connected to the first star coupler; (b) the second block having a plurality of groove structures that are formed on a substrate and in each of which a holey fiber is embedded; (c) the third block including: a plurality of delay waveguides; and grooves that are provided instead of a part of the delay waveguides, each of which being filled with an organic material; and (d) the fourth block including: a plurality of second input waveguides; a slab waveguide connected to the second input waveguides; grooves that are provided on an optical path of the slab waveguide, each of which being filled with an organic material; a heater provided around the grooves; and a mirror that is provided at an end of the slab waveguide and that is disposed on an end face of a substrate.

Additionally, a dispersion compensation circuit of the present invention comprises a first block, a second block and a third block, the first to third blocks being connected together in this order, (a) the first block including: a plurality of first input waveguides; a first star coupler connected to the first input waveguides; a plurality of first delay waveguides connected to the first star coupler; and first grooves that are provided instead of a part of the first delay waveguides, each of which being filled with an organic material; (b) the second block including: a plurality of second input waveguides; a slab waveguide connected to the second input waveguides; second grooves that are provided on an optical path of the slab waveguide, each of which being filled with an organic material; a heater provided around the second grooves; and a plurality of second output waveguides connected to the slab waveguide; and (c) the third block including: a plurality of second delay waveguides; third grooves that are provided instead of a part of the second delay waveguides, each of which being filled with an organic material; a second star coupler connected to the second delay waveguides; and a plurality of third output waveguides connected to the second star coupler.

Additionally, a dispersion compensation circuit of the present invention comprises a first block, a second block, a third block, a fourth block, a fifth block, a sixth block and a seventh block, the first to seventh blocks are connected together in this order, (a) the first block including: a plurality of first input waveguides; a first star coupler connected to the first input waveguides; and a plurality of first output waveguides connected to the first star coupler; (b) the second block having a plurality of first groove structures that are formed on a substrate and in each of which a first holey fiber is embedded; (c) the third block including: a plurality of delay waveguides; and first grooves that are provided instead of a part of the delay waveguides, each of which being filled with an organic material; (d) the fourth block includes a plurality of second input waveguides; a slab waveguide connected to the second input waveguides; second grooves that are provided on an optical path of the slab waveguide, each of which being filled with an organic material; a heater provided around the second grooves; and a plurality of second output waveguides connected to the slab waveguide; (e) the fifth block including: a plurality of second delay waveguides; and third grooves that are provided instead of a part of the second delay waveguides, each of which being filled with an organic material; (f) the sixth block having a plurality of second groove structures that are formed on the substrate and in each of which a second holey fiber is embedded; and (g) the seventh block including: a plurality of third input waveguides; a second star coupler connected to the third input waveguides; and a plurality of third output waveguides connected to the second star coupler.

Additionally, a dispersion compensation circuit of the present invention is comprises a first block, a second block, a third block and a fourth block, the first to fourth blocks are connected together, both ends of a series of the first to fourth blocks are occupied by the first block and the fourth block, respectively, (a) the first block including: a plurality of first input waveguides; a first star coupler connected to the first input waveguides; and a plurality of first output waveguides connected to the first star coupler; (b) the second block including: an input waveguide substrate having a plurality of second input waveguides; substrates each of which has a delay waveguide or a delay line in which a holey fiber is embedded, the delay waveguide or the delay line being connected to the second input waveguide of the input waveguide substrate; and an output waveguide substrate having a plurality of second output waveguides, each of which being connected to the delay waveguide or to the delay line of the substrate, (c) the third block including: a plurality of delay waveguides; and grooves that are provided instead of a part of the delay waveguides, each of which being filled with an organic material; and (d) the fourth block including: a plurality of third input waveguides; a second star coupler connected to the third input waveguide; and a plurality of third output waveguides connected to the second star coupler.

Additionally, a dispersion compensation circuit of the present invention comprises a first block, a second block, a third block and a fourth block, the first to fourth blocks are connected together, both ends of a series of the first to fourth blocks are occupied by the first block and the fourth block, respectively, (a) the first block including: a plurality of first input waveguides; a first star coupler connected to the first input waveguides; and a plurality of first output waveguides connected to the first star coupler; (b) the second block including: an input waveguide substrate having a plurality of second input waveguides; a cylindrical bobbin on which holey fibers connected to the second input waveguides, respectively, of the input waveguide substrate are wound, and an output waveguide substrate having a plurality of second output waveguides connected to the holey fibers, respectively; (c) the third block including: a plurality of delay waveguides; and grooves that are provided instead of a part of the delay waveguides, each of which being filled with an organic material; and (d) the fourth block including: a plurality of third input waveguides; a second star coupler connected to the third input waveguides; and a plurality of third output waveguides connected to the second star coupler.

Effects of the Invention

Effects achieved by a typical mode of the embodiments of the invention disclosed in the present application can be briefly described as follows.

The following advantageous effects are achieved by applying the present invention to a waveguide-type diffraction grating.

(1) It is possible to realize an arrayed waveguide grating that has high resolution and low crosstalk characteristics, since it is possible to measure accurately and easily an error in optical path length by separately forming a delay line array part.

(2) A long delay line array that cannot be realized by waveguides can be achieved by making the delay line array part out of holey fibers. Therefore, the resolution of the diffraction grating can be remarkably improved.

(3) A long delay waveguide array can be realized, and a high-resolution diffraction grating can be realized by using stacked-up delay waveguides.

(4) A small-sized, long delay line array can be realized, and a small-sized, high-resolution diffraction grating can be realized by applying a holey fiber wound on a bobbin to the delay line array.

(5) A dispersion compensation circuit having a wide variable-dispersion compensation range can be realized by arranging a lens having a variable focal distance and a lens having a fixed focal distance near a spectral plane of the high-resolution diffraction grating described in the above (1) to (4).

This specification includes the contents disclosed in the specification and/or drawings of Japanese Patent Application No. 2006-213547, based on which the priority of this application is claimed.

BRIEF DESCRIPTION OF THE DRAWINGS

[FIG. 1] FIGS. 1A to 1F are drawings for explaining a diffraction grating according to a first embodiment of the present invention;

[FIG. 2] FIGS. 2A to 2C are drawings for explaining a diffraction grating according to a second embodiment of the present invention;

[FIG. 3] FIGS. 3A to 3D are drawings for explaining a dispersion compensation circuit according to a third embodiment of the present invention;

FIG. 4 is a drawing for explaining a constitution of a dispersion compensation circuit according to a fourth embodiment of the present invention;

FIG. 5 is a drawing for explaining a constitution of a dispersion compensation circuit according to a fifth embodiment of the present invention;

FIG. 6 is a drawing for explaining a constitution of a dispersion compensation circuit according to a sixth embodiment of the present invention;

FIG. 7 is a drawing for explaining a constitution of a dispersion compensation circuit according to a seventh embodiment of the present invention; and

[FIG. 8]

BEST MODE FOR CARRYING OUT THE INVENTION

Figure 1B:
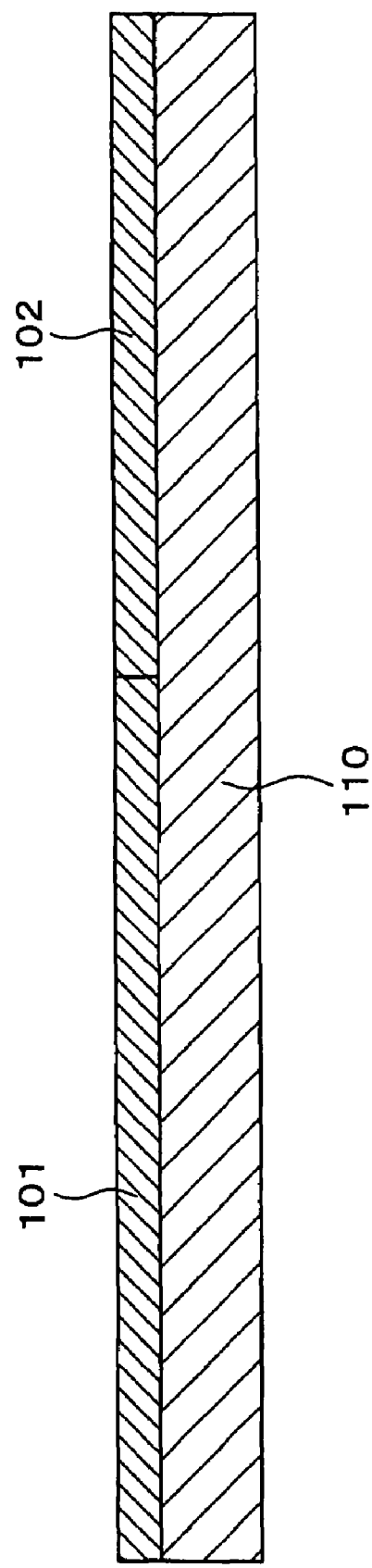

Embodiments of the present invention will be hereinafter described in detail with reference to the accompanying drawings. In all of the drawings referring to which the embodiments are described, elements having the same functions are designated by the same reference signs, respectively, and a repeated description of these elements is omitted. Although the embodiments are described on the assumption that quartz is used as an optical-circuit material, the similar structure is also applicable to other material systems.

First Embodiment

FIGS. 1A to 1F are drawings for explaining a diffraction grating according to a first embodiment of the present invention.

FIG. 1A shows a constitution of the diffraction grating according to the first embodiment. This diffraction grating consists of a first block 101 and a second block 102. The first block 101 is made up of a plurality of input waveguides 103, a slab waveguide (star coupler) 104, a delay waveguide array 105, and a narrow groove 106 filled with an organic material (e.g., resin) The second block 102 is made up of a plurality of input waveguides 107, a slab waveguide (star coupler) 108, and a plurality of output waveguides 109.

FIG. 1B is a cross-sectional view of the constitution of the diffraction grating according to the first embodiment. The first block 101 and the second block 102 are joined together by being bonded with a common holding substrate 110.

FIG. 1C is an enlarged view of point "A", i.e., the narrow groove 106 of the first block 101. (a) of FIG. 1C is a top view, and (b) of FIG. 1C is a cross-sectional view. An upper cladding layer 113, a core layer 114 and a lower cladding layer 115 constitute a waveguide. Herein, the groove 111 is cut through the lower cladding layer 115, and has a length of approximately 5 to 30 micrometers in the optical path direction. The groove 111 is filled with resin 112 that the refractive index has been adjusted. For example, a groove having a length (W) of approximately 10 μm is cut, is then filled with resin that the refractive index has been adjusted to be substantially equal to the effective refractive index (n=1.453) of the waveguide, is then hardened, and consequently the phase is adjusted. An error (δW) in the groove length is approximately ±0.1 μm, and an error (δn) in the refractive index of the resin is approximately ±0.001. This leads to that the range of an error in phase compensation is approximated as follows:

$$\pm 2\pi \times (n\delta W + \delta nW)/\lambda_0 \qquad (1)$$

If the center wavelength ($\lambda_0$) is 1.55 μm, the influence of the error in the groove length becomes dominant, and it is possible to perform both absolute phase control to an accuracy of ±0.6 ($\approx \pm 2\pi \times 1.453 \times 0.1/1.55$) rad and relative phase control to an accuracy of ±0.3 rad. Although an error in the relative phase becomes a problem in the arrayed waveguide grating, a phase adjustment can be made by using this method. However, to make such a phase adjustment, it is essential to measure a relative phase (optical path length) between waveguides. Since the circuit is cut off at the ends of the arrayed waveguides in the present invention, the relative phase can be easily measured.

FIG. 1D is a drawing for explaining a relative phase measurement method. Single-wavelength light (CW light) incident to the first block 101 is distributed to the delay waveguide array 105. An interference waveguide 116 has a pitch connectable with two outputs from the delay waveguide array 105. Although the pitch of the interference waveguide 116 in the drawing is represented as connectable with only adjoining outputs, the interference waveguide 116 may be formed to receive the outputs that are apart from each other. Two beams of output light interfere with each other in the interference waveguide 116, and the beams are branched and output to two output ports 117 and 118. In the circumstances, the output light intensity I1 emitted from the output port 117 and the output light intensity I2 emitted from the output port 118 vary in accordance with a phase difference δ in the output light of the delay waveguide array 105.

Figure 1E:
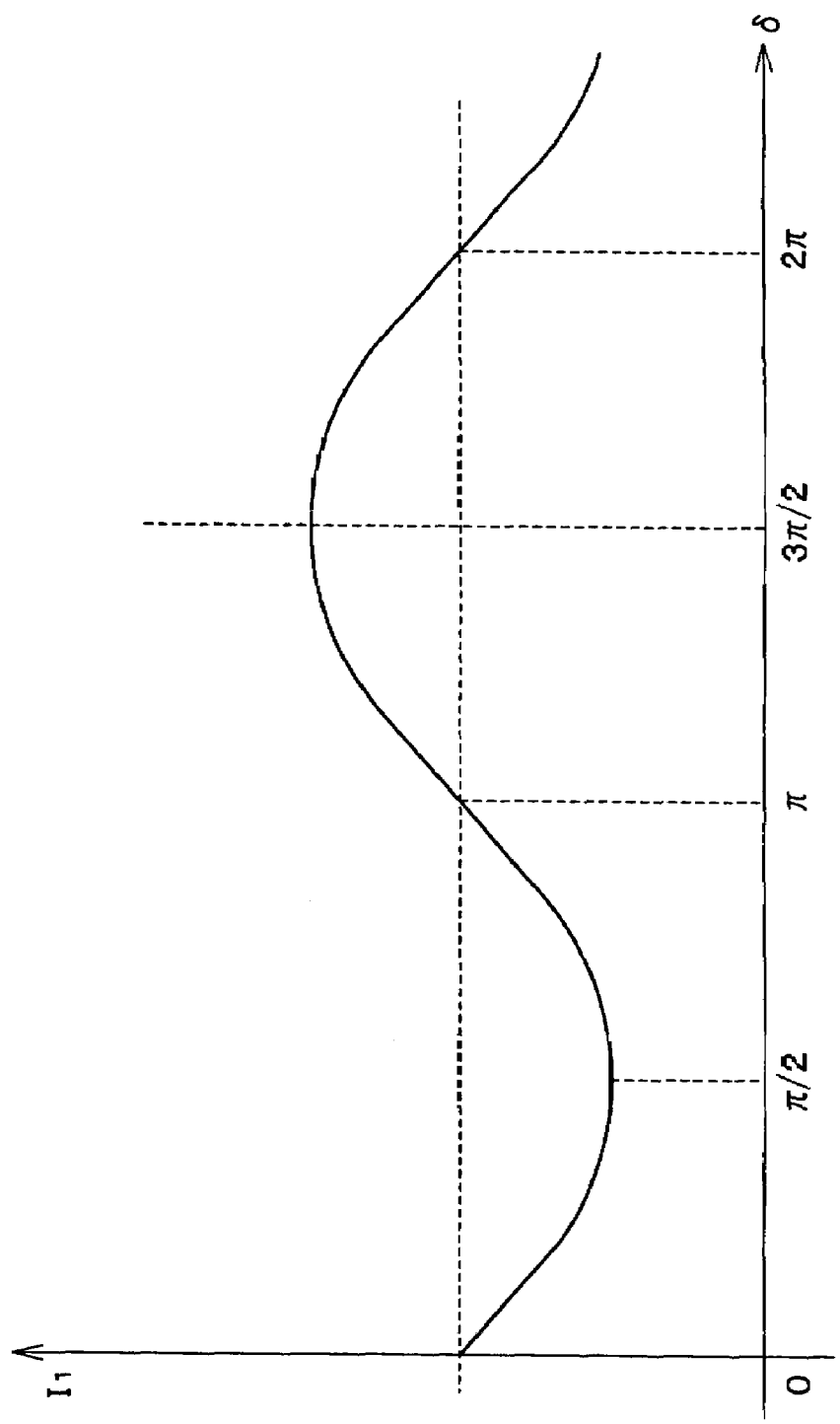

FIG. 1E is a drawing for explaining a relationship between the phase difference δ and the output light intensity I1. A phase difference between two arbitrary arrayed waveguides can be measured by FIG. 1E. A relative phase between the arrayed waveguides can be measured by sequentially measuring the phase difference. The relative phase can be adjusted by measuring the relative phase between the arrayed waveguides in this way. In a standard design of an arrayed waveguide grating, the relative phase comes to 0 (zero) when light with a center wavelength falls on where the input waveguide 107 is connected to the slab waveguide 108.

FIG. 1F is a drawing for explaining a relationship between the waveguide number and the relative phase Φ of the waveguide. The black circle marks represent the relative phases at the input waveguide 107; the triangle marks represent the relative phases at the delay waveguide array 105 before adjusting; and the white circle marks represent the relative phases at the delay waveguide array 105 after adjusting. If the relative phase at the delay waveguide array 105 is adjusted according to the above-described method so as to be configured like the white circle marks, the relative phase between the waveguides can be reduced close to 0 (zero) where the light reaches the slab waveguide 108 after passing through the delay waveguide array 105 and the input waveguide 107. In other words, an error in the optical path length (phase error) can be reduced close to 0 (zero). If an optical path length difference ΔL between adjoining arrayed waveguides is set at a certain value, the constitution of the present embodiment operates as an arrayed waveguide grating. Needless to say, when light with a center wavelength enters where the input waveguide 107 is connected to the slab waveguide 108, the relative phase can be, of course, adjusted to an arbitrary set value instead of 0 (zero). In this case, the constitution of the present embodiment operates as an arrayed waveguide grating by adjusting where the input waveguide 107 is connected to the slab waveguide 108. If a phase error is compensated, the frequency resolution of the arrayed waveguide grating is proportional to the reciprocal of a maximum delay time realized by a delay line array. In other words, in this embodiment, the resolution-enhancement of the arrayed waveguide grating can be achieved within the limits of the substrate size.

Second Embodiment

Figure 2A:
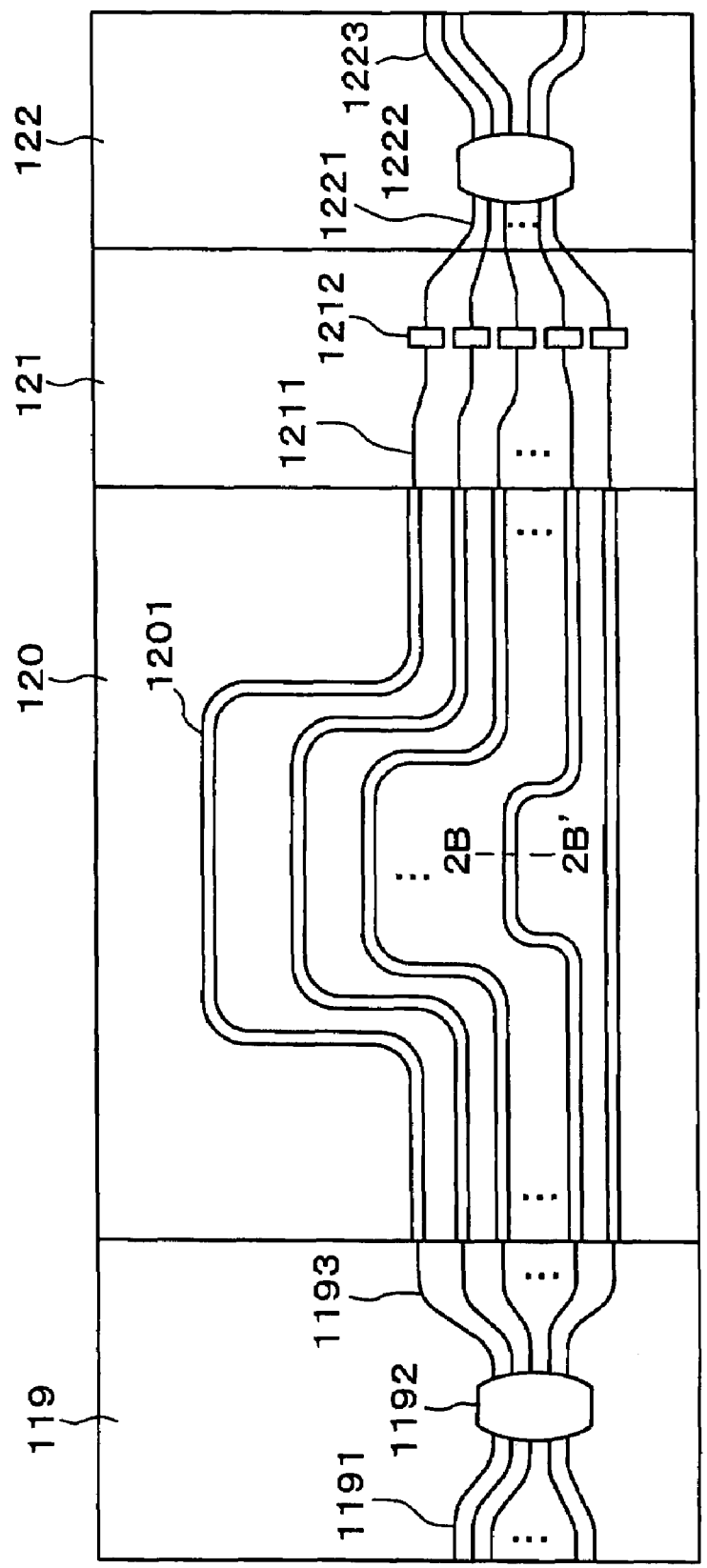

FIG. 2A to 2C are drawings for explaining a diffraction grating according to a second embodiment of the present invention. FIG. 2A shows a constitution of the diffraction grating according to the second embodiment. Herein, a first block 119 is made up of a plurality of input waveguides 1191, a star coupler 1192, and a plurality of output waveguides 1193. The first block 119 serves to distribute incident light to a plurality of waveguides. A second block 120 is made up of a plurality of groove structures 1201 that are provided on a substrate and in each of which a holey fiber is embedded. A third block 121 serves to perform phase control, and is made up of a plurality of delay waveguides 1211 and grooves 1212 each of which is provided at the delay waveguide 1211 and filled with an organic material. A fourth block 122 is made up of a plurality of input waveguides 1221, a star coupler 1222 and a plurality of output waveguides 1223.

FIG. 2B and FIG. 2C are cross-sectional views along line 2B-2B' of the second block 120 of FIG. 2A, showing two examples. Herein, a holey fiber 123 is embedded in grooves 125 and 126, which hold the holey fiber, of the second block 120 and is fixed there by a fixing resin 124. The grooves 125 and 126 are formed by dicing, dry etching, wet etching or the like. The holey fiber 123 that typically has six holes 1231 in the periphery of its core is 2 mm in bend radius and approximately 0.01 dB in one-roll bend loss. Therefore, even if many bends are provided, an increase in loss is slight. The propagation loss is 0.0005 dB/m or less. On the other hand, although the bend loss of a quartz waveguide having a relative refractive index difference of 1.5% is on the same level as above, the propagation loss thereof exhibits a high value of 3 dB/m. After the grooves 125 and 126 are cut, the holey fiber 123 is embedded therein. Thereafter, the grooves 125 and 126 are filled with the fixing resin 124 and are hardened, and both ends of the second block 120 are ground; thus, the block is formed. If dry etching is applied, the position accuracy of the groove is approximately ±0.5 µm, and a deviation at the core position of the fiber becomes even smaller. From these positional deviations, an error in the length is estimated at approximately ±5 µm on the two suppositions; first, the length along the optical path of the fiber is 1 m, and second, 180-degree bend is performed twenty times. However, what is important as an arrayed waveguide grating is a deviation from the set value of a difference ΔL in length between adjoining delay lines. If the set value of ΔL is 2 mm, the deviation is ±10 nm: negligibly small. After the first block 119, the second block 120 and the third block 121 are joined together, the relative phase is measured and a phase adjustment is performed as done in the first embodiment. Thereafter, the fourth block 122 is joined therewith; thus, an arrayed waveguide grating is completed. In comparison with the first embodiment, the holding substrate of the delay lines has no need to undergo uniform thin film growth, hence a large-sized substrate can be used; for example, commercial items can be used for a silicon substrate of up to twelve inches in size. Additionally, the propagation loss of the holey fiber is incomparably smaller than that of the optical waveguide, hence a long delay line can be realized. Therefore, if phase compensation is achieved, a diffraction grating having even higher resolution than in the first embodiment can be realized.

Third Embodiment

Figure 3A:
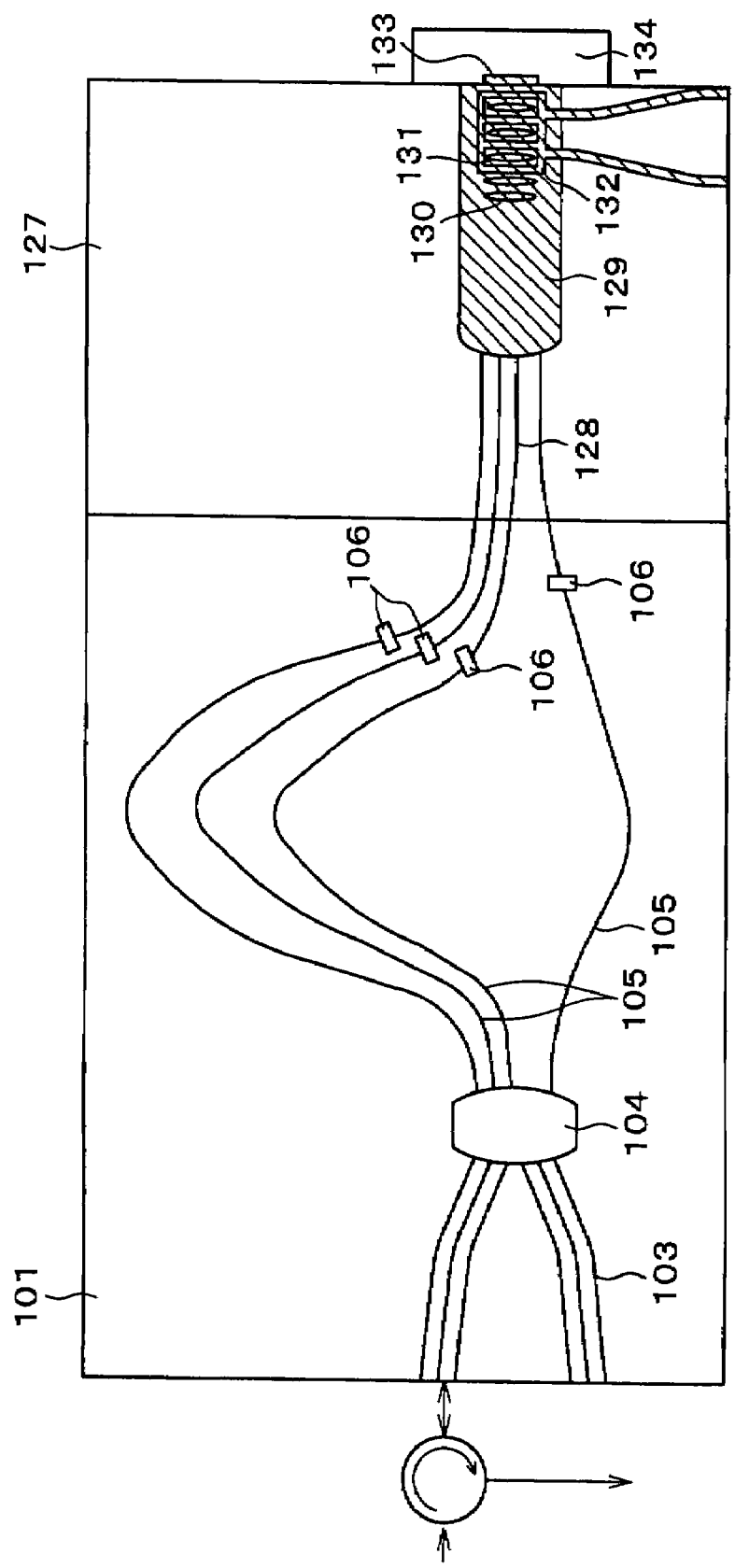

FIG. 3A to 3D are drawings for explaining a dispersion compensation circuit according to a third embodiment of the present invention. FIG. 3A shows a constitution of the dispersion compensation circuit according to the third embodiment. A first block 101 is the same as the first block 101 described in the first embodiment. A second block 127 is a variable dispersion compensation block, and is made up of input/output waveguides 128, a slab waveguide 129, a waveguide lens 130 whose temperature is not controlled, a waveguide lens 131 whose temperature is controlled, a heater 132, a mirror 133 and a mirror-holding substrate 134. The mirror 133 is placed at the spatial free spectral range of a diffraction grating composed of the first block 101 and the second block 127. An optical circuit in which a mirror is disposed on a spectral plane of a diffraction grating with a lens provided near the mirror so as to compensate dispersion is publicly known. Since arrayed waveguides formed in the same way as in the first embodiment are used, a feature of the present embodiment is that the embodiment can reduce phase error; reduce loss in the dispersion compensation circuit, for example, by controlling the phase where the input/output waveguide 128 and the slab waveguide 129 are connected; or improve the design freedom of the lens. Furthermore, another feature is it disposes both lenses that changes its focal distance by controlling temperature and that does not change its focal distance by not controlling temperature. If it is designed that second-order dispersion has a specific value at a certain temperature against a planar mirror 133, the focal length of the lens is uniquely determined, and there will be a case in which a sufficient amount of phase control by temperature control cannot be obtained. However, the amount of dispersion compensation can be biased by the lens that does not change its focal distance by not controlling temperature, hence this problem can be solved.

FIG. 3B is an enlarged-view near the lenses. (a) of FIG. 3B is a top view, and (b) of FIG. 3B is a cross-sectional view. Herein, resin 135 and resin 136 are filled in the grooves. Although the lens is formed in convex shape in this embodiment, a concave lens, a meniscus lens, a planoconvex lens and a planoconcave lens can also be used. The positive or negative of the lens can be selected not only by the lens shape but also by choosing whether the refractive index of the resin is to be made greater or smaller than the slab waveguide refractive index. It is also possible to employ a structure in which temperature dependency is not caused by putting no resin into the waveguide lens 130.

Figure 3C:
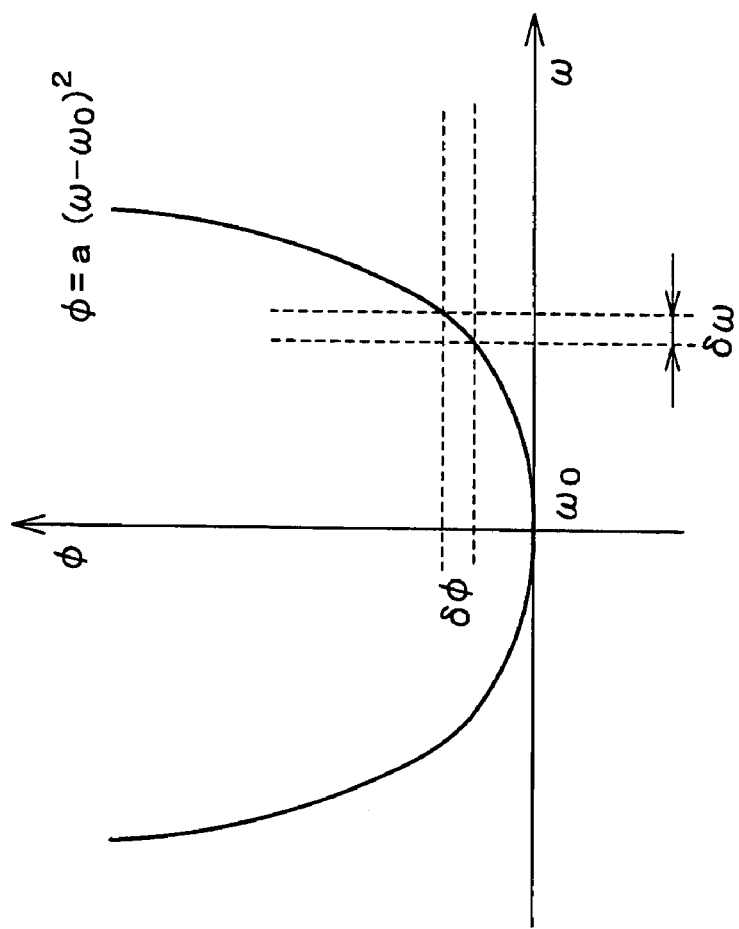

FIG. 3C is a drawing for explaining the principle of variable dispersion compensation. In input/output spectral characteristics of the device according to the third embodiment, if the Fourier phase (spectral phase) $\Phi$ satisfies the following equation where $\omega_0$ is a center angular frequency:

$$\Phi = a(\omega - \omega_0)^2 \tag{2}$$

the device has a second-order dispersion value proportional to "a." Additionally, "a" is proportional to the focal distance of the lens group consisting of the lenses 130 and 131 disposed near a reflecting mirror serving as a spectral plane. Still additionally, this focal distance varies according to the refractive index of the resin from which the lens is made, and hence the temperature of the lens can be locally controlled by the heater 132; consequently, the second-order dispersion value can be controlled. Still additionally, the settable range of "a" is proportional to the frequency resolution of the diffraction grating part. The reason is that if the frequency resolution is given for $\delta\omega$ in the drawing, a phase change $\delta\Phi$ in this range is required to be sufficiently small (for example, $\pi/16$). Since a high-resolution diffraction grating is realized in the present invention, as a consequence, the possible amount of dispersion compensation increases, as well.

Figure 3D:
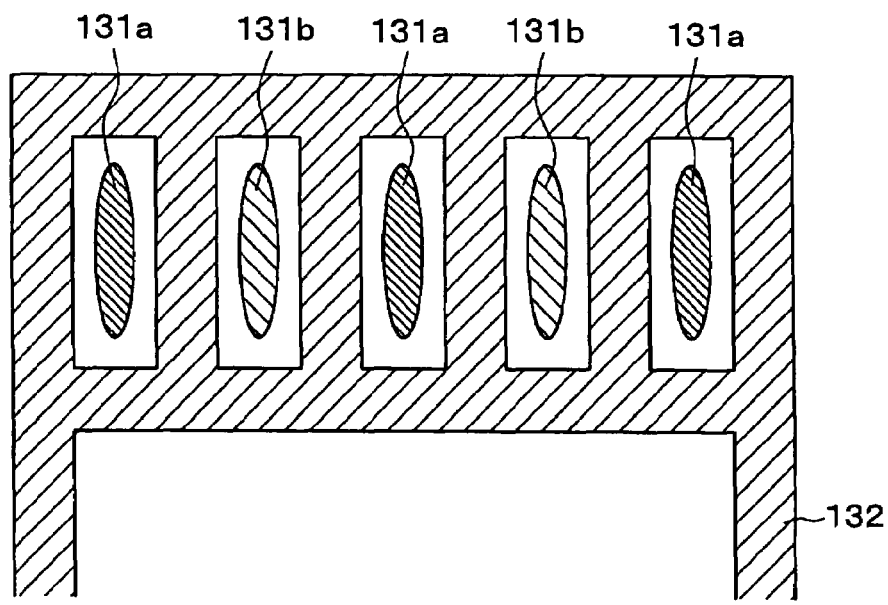
Figure 3D:
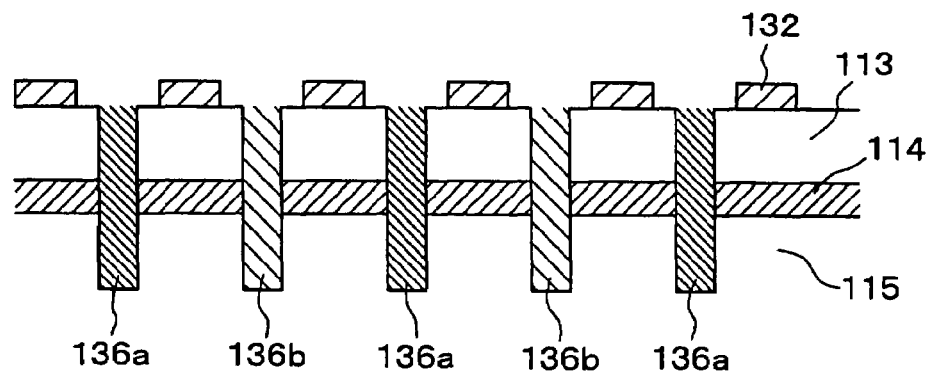

FIG. 3D is an enlarged-view near lenses in an example having another lens constitution. (a) of FIG. 3D is a top view, and (b) of FIG. 3D is a cross-sectional view. Herein, resin 136a and resin 136b have different refractive index. A lens 131a is filled with the resin 136a, and a lens 131b is filled with the resin 136b. For example, if the lens 131a and the lens 131b are both formed in convex shape while the refractive index of the resin 136a is greater than the effective refractive index of the slab waveguide, and the refractive index of the resin 136b is smaller than the effective refractive index of the slab waveguide; the lens 131a will function as a convex lens and the lens 131b will function as a concave lens. In other words, the number of lens stages can be set widely by adjusting both the shape of each lens and the refractive index of each resin in order to obtain the focal distance of a certain lens system. Since the temperature dependency of the refractive index of the resin is always negative, the amount of phase change depending on a temperature change can be increased by increasing the total number of stages. That is, this constitution also makes it possible independently to set the amount of dispersion compensation and the focal distance of a lens system.

Fourth Embodiment

Figure 4:
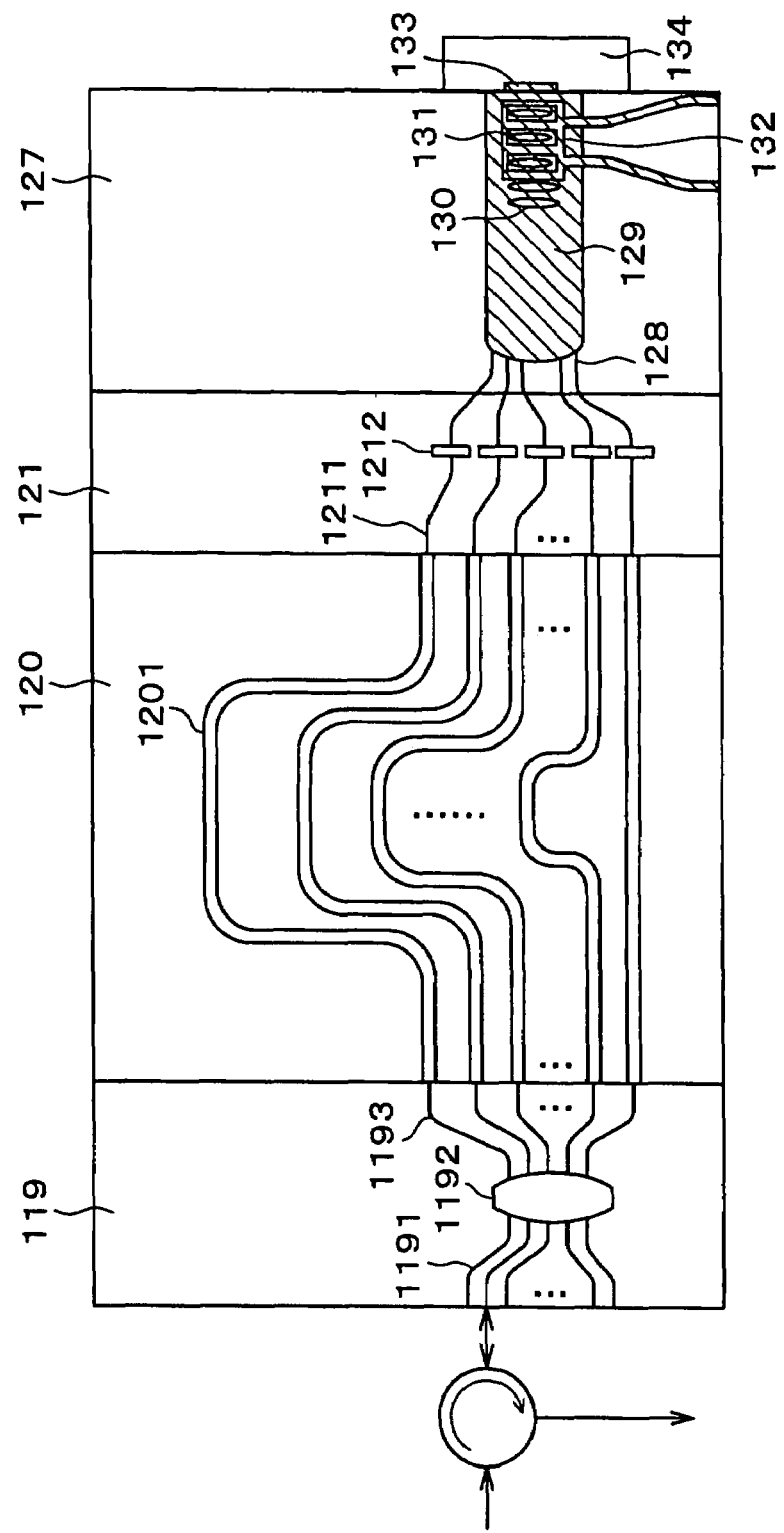
[FIG. 4]

FIG. 4 is a drawing for explaining a constitution of a dispersion compensation circuit according to a fourth embodiment of the present invention. The fourth embodiment is composed by joining the second block (variable dispersion compensation block) 127 of the third embodiment to the first block 119, the second block 120 and the third block 121 of the second embodiment. Since the fourth embodiment can achieve a higher-resolution of diffraction grating than the first embodiment can, the constitution of the fourth embodiment has the advantage of being able to make the amount of dispersion compensation even greater.

Fifth Embodiment

Figure 5:
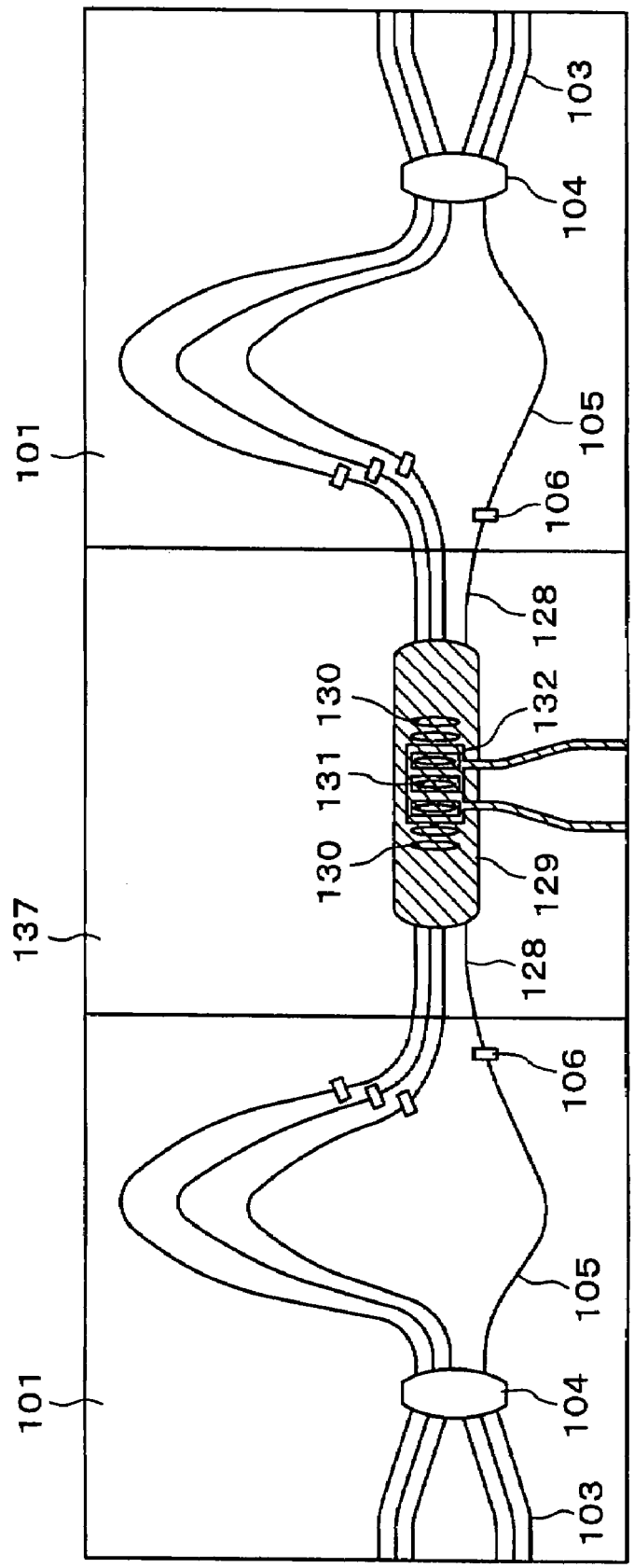
[FIG. 5]

FIG. 5 is a drawing for explaining a constitution of a dispersion compensation circuit according to a fifth embodiment of the present invention. The fifth embodiment is composed as a transmission dispersion compensator by joining a transmission variable dispersion compensation block 137 to the two first blocks 101. Since this is transmissive, an optical circulator for input/output becomes unnecessary.

Sixth Embodiment

Figure 6:
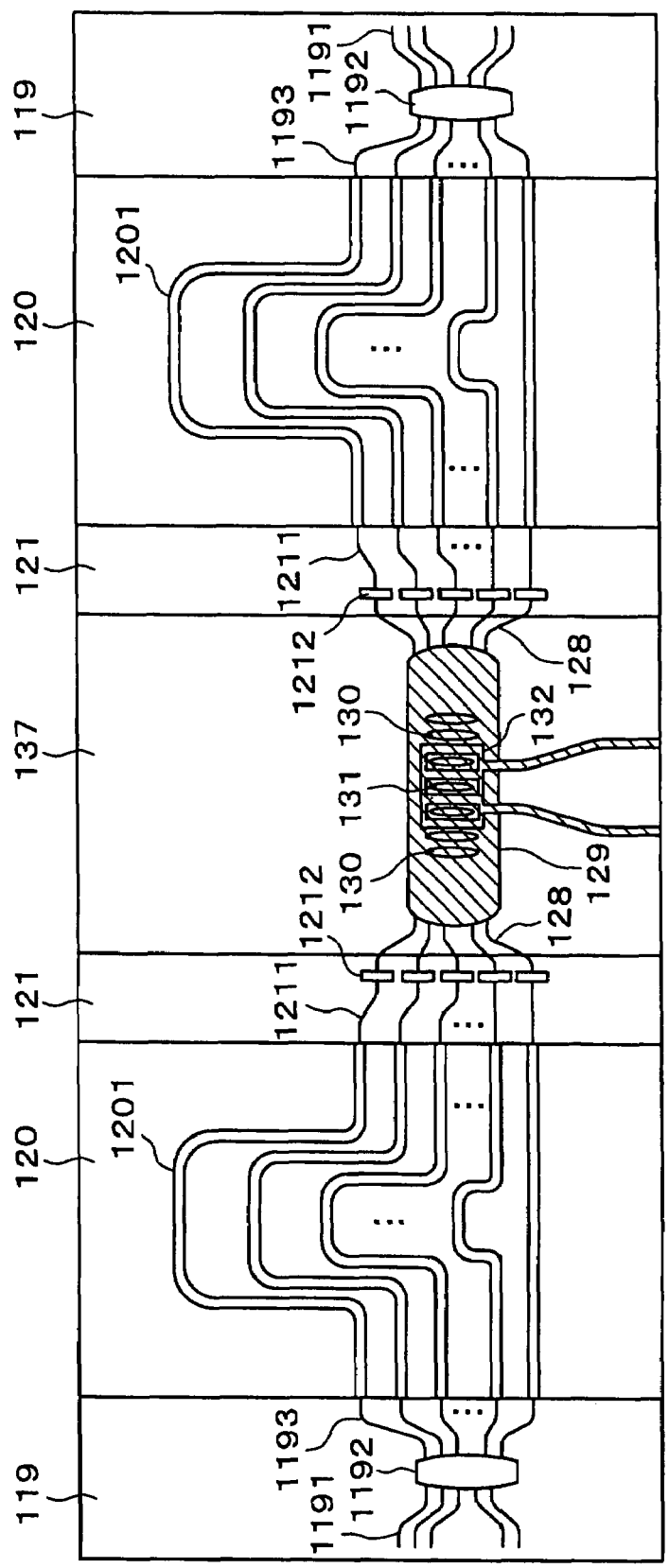
[FIG. 6]

FIG. 6 is a drawing for explaining a constitution of a dispersion compensation circuit according to a sixth embodiment of the present invention. The sixth embodiment is composed as a transmission dispersion compensator by joining a transmission variable dispersion compensation block 137 to the two first blocks 119, the two second blocks 120 and the two third blocks 121. Since this is transmissive, an optical circulator for input/output becomes unnecessary.

Seventh Embodiment

Figure 7:
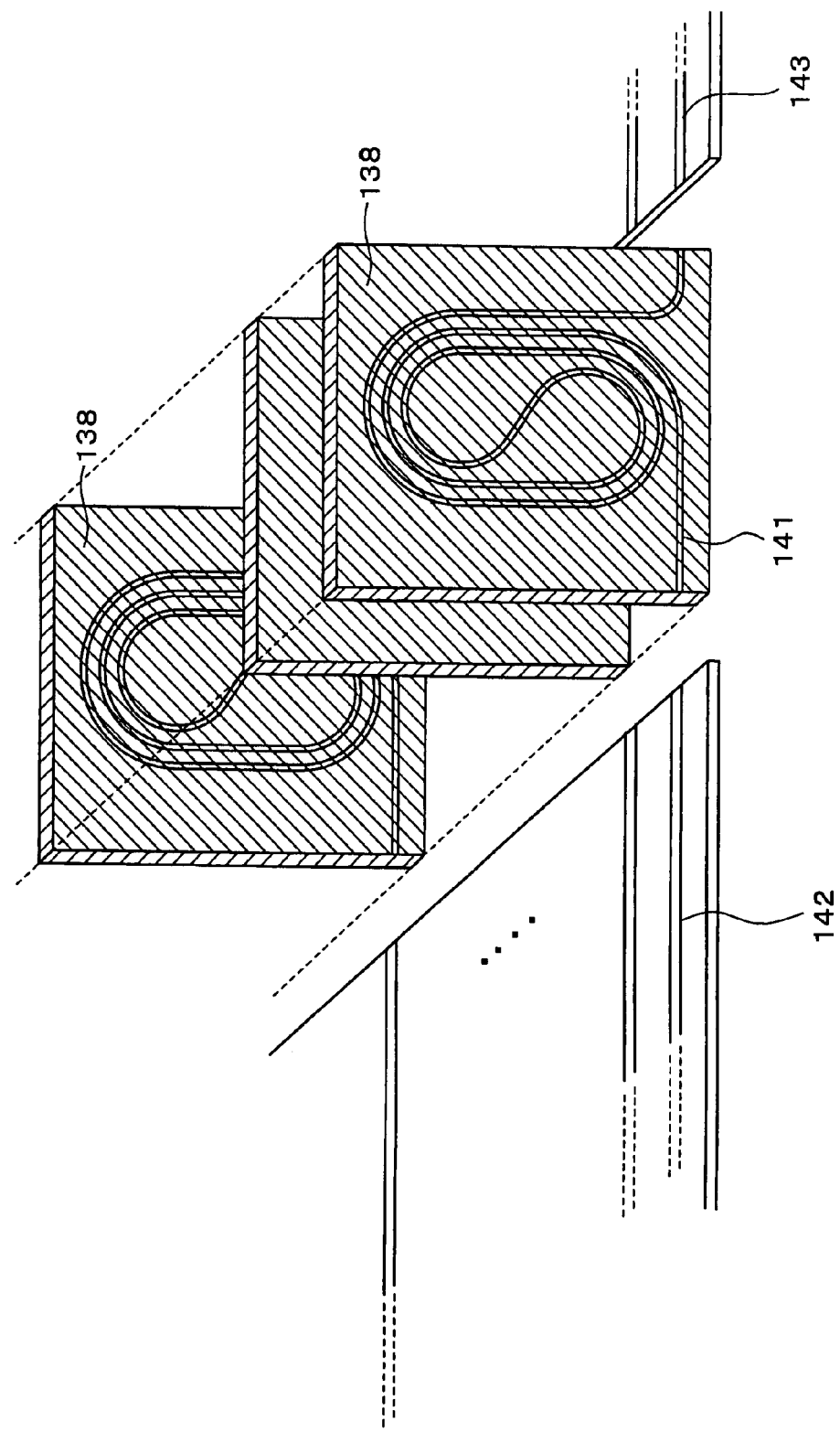
[FIG. 7]

FIG. 7 is a drawing for explaining a constitution of a dispersion compensation circuit according to a seventh embodiment of the present invention. In the seventh embodiment, instead of the second block 120 of the second, fourth and sixth embodiments, there is applied a block configuration which consists of a plurality of input waveguides 142, an optical delay line array in which substrates 138 each of which equipped with a delay waveguide 141 are stacked, and a plurality of output waveguides 143. Since a plurality of substrates are used, a long delay waveguide can be realized.

Eighth Embodiment

Figure 8A:
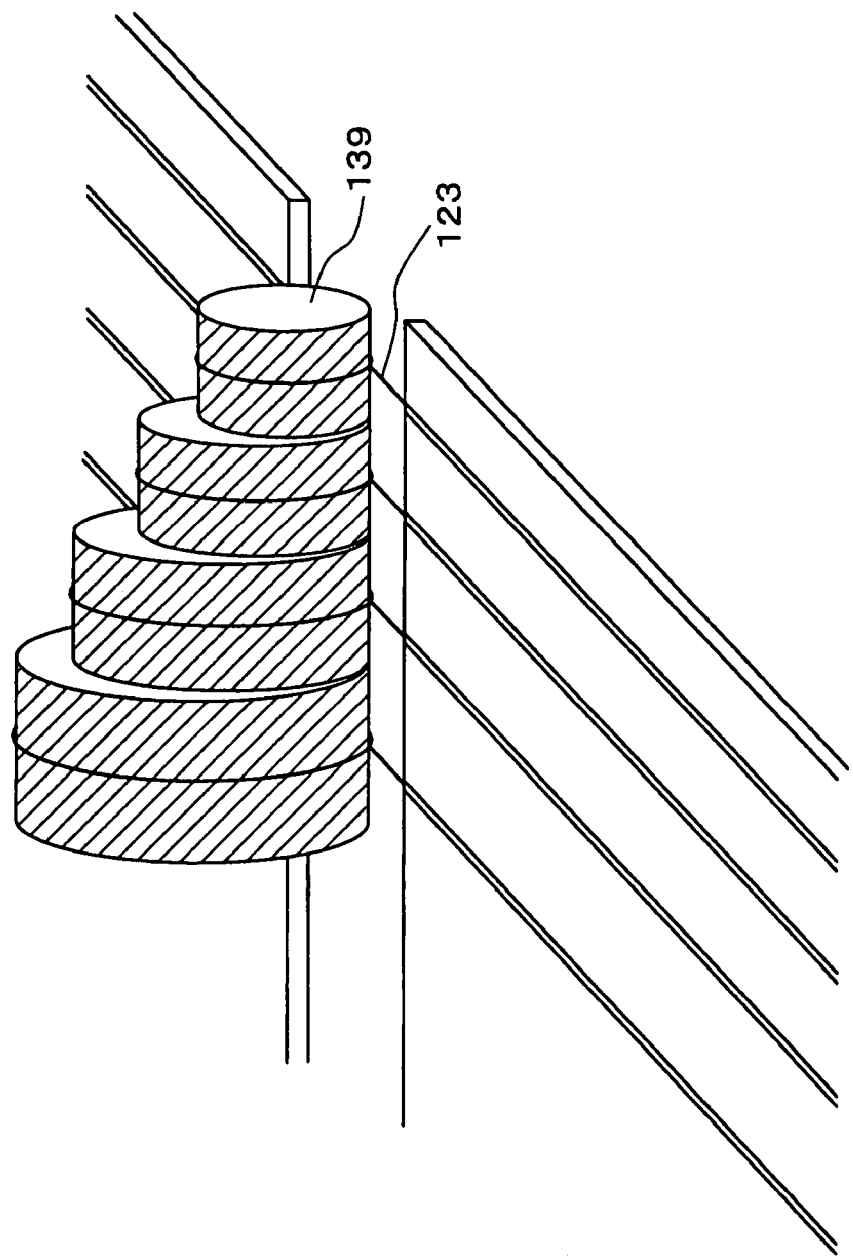
FIGS. 8A and 8B are drawings for explaining a constitution of a dispersion compensation circuit according to an eighth embodiment of the present invention.
Figure 8B:
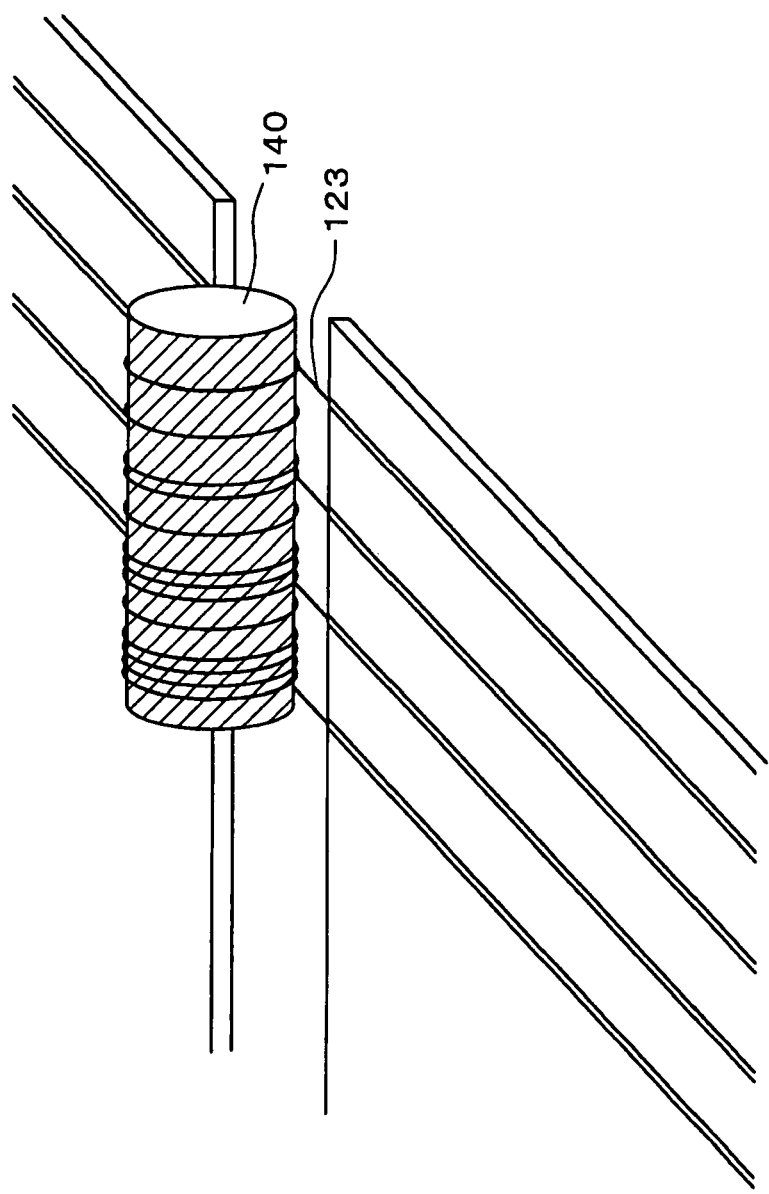

FIG. 8A and 8B are drawings for explaining a constitution of a dispersion compensation circuit according to an eighth embodiment of the present invention. In the eighth embodiment, instead of the second block 120 of the second, fourth and sixth embodiments, there is applied a block configuration which consists of an optical delay line array composed by winding a holey fiber 123 on bobbins 139 and 140. This embodiment is effective to reduce the size of the device where the delay line is long.

The present invention is not limited to the above embodiments.

All publications, patents and patent applications cited in the present specification are herein incorporated by reference in their entirety.

The invention claimed is:

1. A diffraction grating comprising a first block, a second block, a third block and a fourth block, the first to fourth blocks being connected together, both ends of a series of the first to fourth blocks being occupied by the first block and the fourth block, respectively, (a) the first block including:
a plurality of first input waveguides;
a first star coupler connected to the first input waveguides; and
a plurality of first output waveguides connected to the first star coupler;
(b) the second block having a plurality of groove structures that are formed on a substrate and in each of which a holey fiber is embedded;
(c) the third block including:
a plurality of delay waveguides; and
grooves that are provided instead of a part of the delay waveguides, each of which being filled with an organic material; and
(d) the fourth block including:
a plurality of second input waveguides;
a second star coupler connected to the second input waveguides; and
a plurality of second output waveguides connected to the second star coupler.

2. A dispersion compensation circuit comprising a first block, a second block, a third block and a fourth block, the first to fourth blocks being connected together, both ends of a series of the first to fourth blocks being occupied by the first block and the fourth block, respectively, (a) the first block including:
a plurality of first input waveguides;
a first star coupler connected to the first input waveguides; and
a plurality of output waveguides connected to the first star coupler;
(b) the second block having a plurality of groove structures that are formed on a substrate and in each of which a holey fiber is embedded;
(c) the third block including:
a plurality of delay waveguides; and
grooves that are provided instead of a part of the delay waveguides, each of which being filled with an organic material; and
(d) the fourth block including:
a plurality of second input waveguides;
a slab waveguide connected to the second input waveguides;
grooves that are provided on an optical path of the slab waveguide, each of which being filled with an organic material;
a heater provided around the grooves; and
a mirror that is provided at an end of the slab waveguide and that is disposed on an end face of a substrate.

3. A dispersion compensation circuit comprising a first block, a second block, a third block, a fourth block, a fifth block, a sixth block and a seventh block, the first to seventh blocks being connected together in this order, (a) the first block including:
a plurality of first input waveguides;
a first star coupler connected to the first input waveguides; and
a plurality of first output waveguides connected to the first star coupler;
(b) the second block having a plurality of first groove structures that are formed on a substrate and in each of which a first holey fiber is embedded;
(c) the third block including:
a plurality of delay waveguides; and
first grooves that are provided instead of a part of the delay waveguides, each of which being filled with an organic material;
(d) the fourth block including:
a plurality of second input waveguides;
a slab waveguide connected to the second input waveguides;
second grooves that are provided on an optical path of the slab waveguide, each of which being filled with an organic material;
a heater provided around the second grooves; and
a plurality of second output waveguides connected to the slab waveguide;
(e) the fifth block including:
a plurality of second delay waveguides; and
third grooves that are provided instead of a part of the second delay waveguides, each of which being filled with an organic material;
(f) the sixth block having a plurality of second groove structures that are formed on the substrate and in each of which a second holey fiber is embedded;
(g) the seventh block including:
a plurality of third input waveguides;
a second star coupler connected to the third input waveguides; and
a plurality of third output waveguides connected to the second star coupler.

4. A diffraction grating comprising a first block, a second block, a third block and a fourth block, the first to fourth blocks being connected together, both ends of a series of the first to fourth blocks being occupied by the first block and the fourth block, respectively, (a) the first block including:
a plurality of first input waveguides;
a first star coupler connected to the first input waveguides; and
a plurality of first output waveguides connected to the first star coupler;
(b) the second block including:
an input waveguide substrate having a plurality of second input waveguides;
substrates, each of which has a delay waveguide or a delay line in which a holey fiber is embedded, the delay waveguide or the delay line being connected to the second input waveguides, respectively, of the input waveguide substrate; and
an output waveguide substrate having a plurality of second output waveguides, each of which being connected to the delay waveguide or to the delay line of the substrate;
(c) the third block including:
a plurality of delay waveguides; and
grooves that are provided instead of a part of the delay waveguides, each of which being filled with an organic material;
(d) the fourth block including:
a plurality of third input waveguides;
a second star coupler connected to the third input waveguide; and
a plurality of third output waveguides connected to the second star coupler.

5. A diffraction grating comprising a first block, a second block, a third block and a fourth block, the first to fourth blocks being connected together, both ends of a series of the first to fourth blocks being occupied by the first block and the fourth block, respectively, (a) the first block including:
a plurality of first input waveguides;

a first star coupler connected to the first input waveguides; and a plurality of first output waveguides connected to the first star coupler;

(b) the second block including:

an input waveguide substrate having a plurality of second input waveguides;

a cylindrical bobbin on which holey fibers connected to the second input waveguides, respectively, of the input waveguide substrate are wound; and an output waveguide substrate having a plurality of second output waveguides connected to the holey fibers, respectively;

(c) the third block including:

a plurality of delay waveguides; and grooves that are provided instead of a part of the delay waveguides, each of which being filled with an organic material; and (d) the fourth block including:

a plurality of third input waveguides;

a second star coupler connected to the third input waveguides; and a plurality of third output waveguides connected to the second star coupler.

* * * * *